United States Statutory Invention Registration [19]

[11] Reg. Number: H757

Darrow et al. [43] Published: Mar. 6, 1990

[54] METHOD OF SUSTAINING A RADIAL ELECTRIC FIELD AND POLOIDAL PLASMA ROTATION OVER MOST OF THE CROSS-SECTION OF A TOKAMAK

[75] Inventors: Douglass S. Darrow, Plainsboro; Masayuki Ono, Princeton Jct., both of N.J.

[73] Assignee: The United States of America as represented by the Department of Energy, Washington, D.C.

[21] Appl. No.: 351,629

[22] Filed: May 12, 1989

[51] Int. Cl.[4] ..... H01J 7/24

[52] U.S. Cl. ..... 315/111.71; 376/133

*Primary Examiner*—Nelson Moskowitz
*Assistant Examiner*—Linda J. Wallace
*Attorney, Agent, or Firm*—Paul A. Gottlieb; William R. Moser; Richard E. Constant

[57] ABSTRACT

A radial electric field of a desired magnitude and configuration is created throughout a substantial portion of the cross-section of the plasma of a tokamak. The radial electric field is created by injection of a unidirectional electron beam. The magnitude and configuration of the radial electric field may be controlled by the strength of the toroidal magnetic field of the tokamak.

4 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF SUSTAINING A RADIAL ELECTRIC FIELD AND POLOIDAL PLASMA ROTATION OVER MOST OF THE CROSS-SECTION OF A TOKAMAK

CONTRACTUAL ORIGIN OF THE INVENTION

The U.S. Government has rights in this invention pursuant to Contract No. DE-AC02-76CH03073 between the U.S. Department of Energy and Princeton University.

BACKGROUND OF THE INVENTION

The present invention relates generally to a method for increasing energy confinement and controlling transport in the plasma of a tokamak. More particularly, the present invention relates to a method of creating and sustaining a radial electric field throughout a substantial portion of the cross-section of the plasma. The configuration and magnitude of the radial electric field that may be achieved is determined by the apparatus used to create the radial electric field and plasma and by the relationship of apparatus parameters to the resulting radial electric field.

The apparatus for toroidal magnetic confinement that is most popular in controlled fusion research today is the tokamak device. To date, the experiments that have been performed with tokamaks to create high temperature plasmas have been of short duration. The duration and energy confinement of the tokamak plasma must be increased to produce useful amounts of energy with this device. A radial electric field within the plasma of a tokamak has been experimentally shown to increase energy confinement. Theoretical work has been the basis of the proposition that radial electric fields can reduce particle and energy loss from tokamak plasmas. Experimental results reported by Oren et al, J. of Nuclear Materials 111 & 112, 34, (1982) demonstrated that overall confinement time would increase by a factor of 10 when a radial electric field was created in the plasma of a tokamak by a cold cathode or a tungsten filament. Particle and energy confinement are known to be closely related. The radial electric field that was created in the plasma by this method was of significant magnitude only at the extreme edges of the plasma. A problem which arises from longer duration plasmas is the accumulation of impurities and if fusion is occurring, fusion waste products such as helium ash. Impurity accumulation within the plasma was demonstrated by Oren et al. when a negative potential was induced within the plasma. The accumulation approached a constant value as the radial electric field decreased.

Taylor et al. Phys. Rev. Letters. 42. 446 (1979) reported that electron injection from a tungsten filament would suppress impurity influx. The injection of cold electrons was reported to reduce the sheath potential and decelerate ions before they hit the wall reducing impurity production at the wall. Control of the potential at the edge of the plasma was recognized as a mechanism for controlling production of impurities.

M. Ono et al., Phys. Rev. Letters 60, 294 (1988) reported improvements in both energy and particle confinement times associated with radial electric fields produced by radiofrequency heating of a tokamak plasma. The magnitude of internal turbulence was observed to be greatly reduced in the presence of the radial electric field, and energy confinement times improved by 30%.

Itoh and Itoh, Phys. Rev. Letters 60, 2276 (1988) and Shaing et al., Comments Plasma Phys. Controlled Fusion 12, 69 (1988) present theories which claim that radial electric fields will influence the transport of particles in tokamak plasmas and will thus affect confinement of both particles and energy. The method postulated is that a resonant interaction between the magnetic structure and particles of a particular velocity causes rapid transport of those particles to the edge of the plasma. The application of a radial electric field shifts the resonant velocity from one that many particles possess to one shared by only a few. Hence, only a few particles then participate in transport. In particular, Shaing et al. suggest that producing a negative radial electric field will reduce transport and improve confinement.

An electric field in the plasma in the presence of a magnetic field perpendicular to the electric field will cause rotation of the plasma in the plane of the electric field. A radial electric field in the plasma is perpendicular to the toroidal magnetic field, therefore a poloidal rotation of the plasma will result from a radial electric field. Poloidal plasma rotation can cause a change in plasma transport and would preferentially affect heavier ions which are generally impurities in a tokamak plasma. Poloidal plasma rotation may therefore provide an additional method for impurity control.

Radial electric fields have been shown to produce significant increases in confinement of the plasma of a tokamak and to exert a significant influence on the production of impurities. The methods and apparatus which have been used to induce radial potential gradients and electric fields have been effective only at the edge of the plasma. The ability to induce a radial electric field throughout a substantial area of the cross-section of the plasma would provide a mechanism for additional control of radial transport and the potential for further improvement in confinement and impurity controls in tokamaks.

Therefore, in view of the above, it is an object of the present invention to provide a method for creating and maintaining a radial electric field throughout a substantial cross-section of the plasma of a tokamak. It is another object of the present invention to provide a method for creating and maintaining a radial electric field of a desired configuration and magnitude.

Additional objects, advantages and novel features of the invention will be set forth in part in the description which follows and in part will become apparent to those skilled in the art upon examination of the following or may be learned from practice of the invention. The objects and advantages of the invention may be realized and attained by means of the instrumentalities and combinations particularly pointed out in the appended claims.

SUMMARY OF THE INVENTION

To achieve the foregoing and other objects in accordance with the purposes of the present invention, as embodied and broadly described herein, the method of this invention comprises providing a cathode for emitting an unidirectional electron beam and anodes within the vacuum vessel of a tokamak, determining the toroidal magnetic field strength necessary to achieve potential profile and magnitude that is desired to be maintained within the plasma, applying a toroidal magnetic field of the determined field strength, applying a vertical magnetic field sufficient to cause an electron emitted from the cathode to miss the cathode after traversing one circuit of the tokamak, creating a plasma within the tokamak, and injecting a beam of electrons from the cathode. The plasma may be formed and plasma current driven by the injected beam of electrons.

The apparatus which may be used to practice this method determines the relationship between toroidal magnetic field strength and potential and radial electric field for a given plasma current and cathode voltage. Unidirectional electron beam injection causing a helical current near the boundary of the tokamak plasma results in a radial electric field over most of the plasma cross-section. The relationship between magnetic toroidal field strength and potential and radial electric field that may be used to create a desired radial electric field may be determined by experimental measurement.

BRIEF DESCRIPTION OF THE DRAWINGS

The accompanying drawings, which are incorporated in and form a part of the specification, illustrate an embodiment of the present invention and together with the description, serve to explain the principles of the invention. In the drawings.

DETAILED DESCRIPTION OF THE INVENTION

To further understand the present invention, it should be realized that the potential gradient that is created within the plasma is the result of a unidirectional electron beam which circulates around the main plasma along magnetic field lines. The preferred embodiment of the invention utilizes the injected electron beam to create and sustain the tokamak plasma configuration as well as to create the radial electric field within the plasma.

Figure 1:
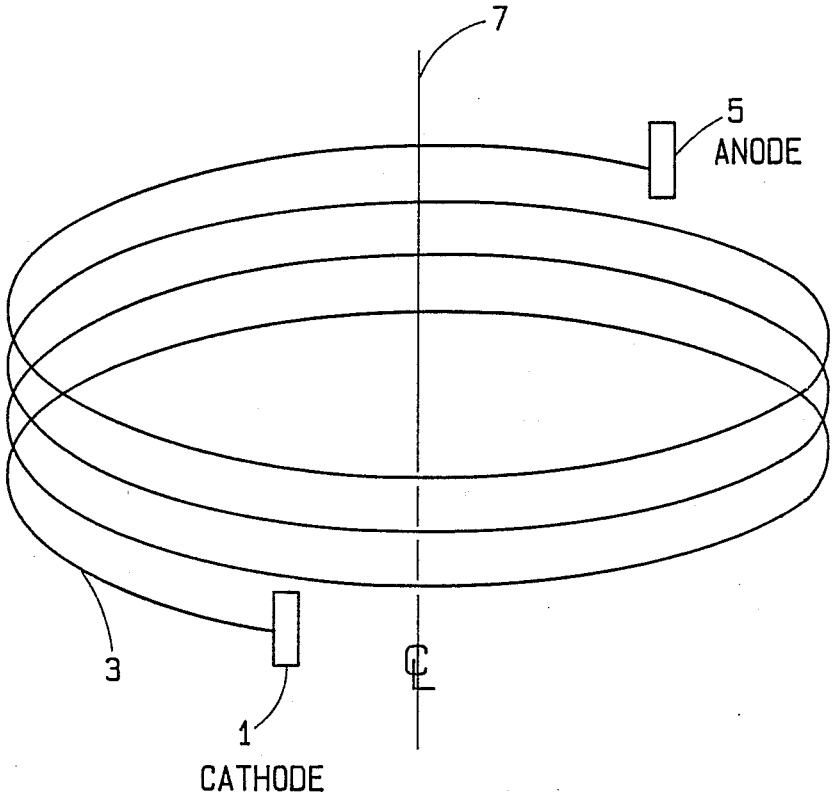
FIG. 1 illustrates the upward path of the unidirectional electron beam.

FIG. 1 illustrates the path of the unidirectional electron beam injected from a cathode, 1, in a toroidal direction. The beam path, 3, follows an upward helical path of radius approximately that of the major radius of the tokamak. The path terminates at an anode, 5. Center line, 7, is the center of the major radius of the tokamak. A toroidal magnetic field within the tokamak creates circular lines of magnetic force. A circular path would allow a beam to traverse one circuit and then encounter the cathode. In order to avoid the cathode, a vertical magnetic field was imposed of strength 7–10 G near the cathode. This strength was shown to be sufficient for an electron beam injected at energy between 250 ev and 500 ev into a tokamak of major radius 59 cm and minor radius of 10 cm with a toroidal magnetic field between 3.43 KG and 4.48 KG.

Figure 2:
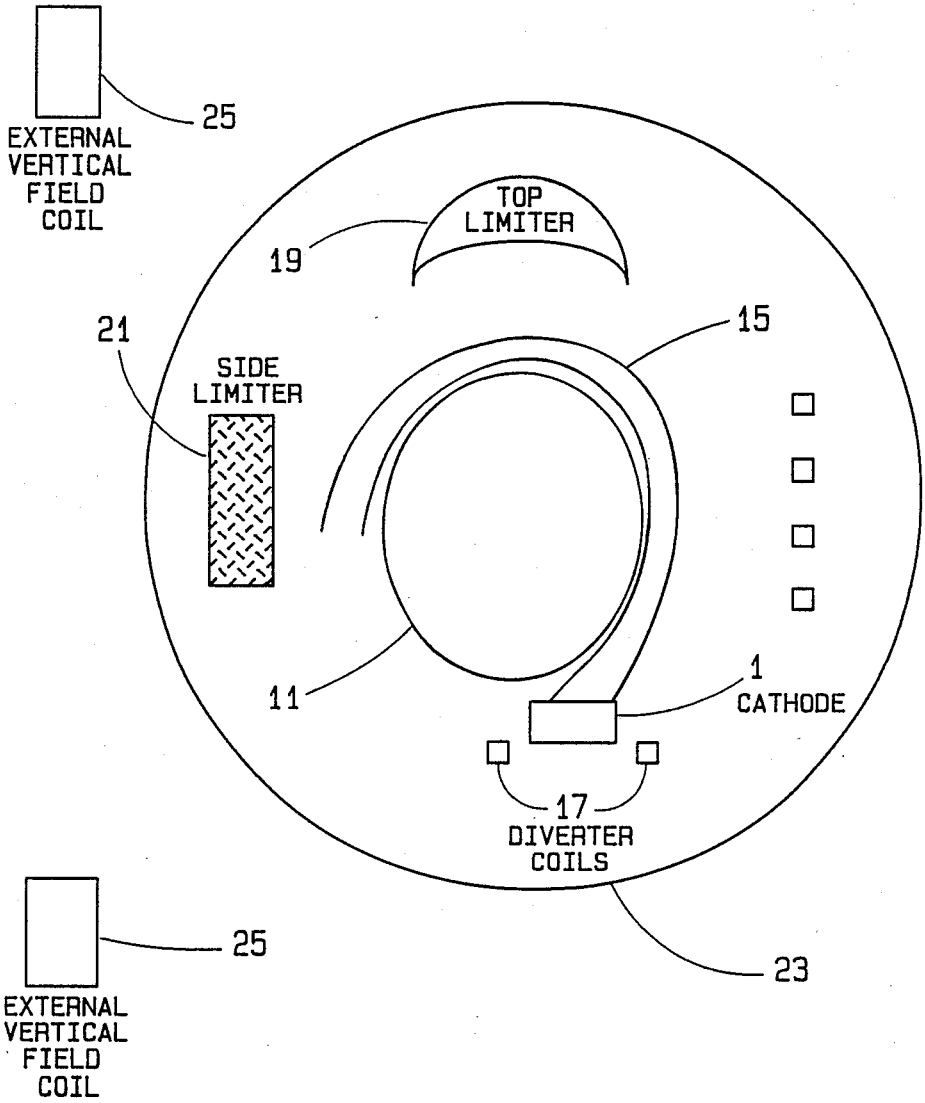
FIG. 2 illustrates a poloidal cross section of a tokamak during operation of the present invention.
Figure 3:
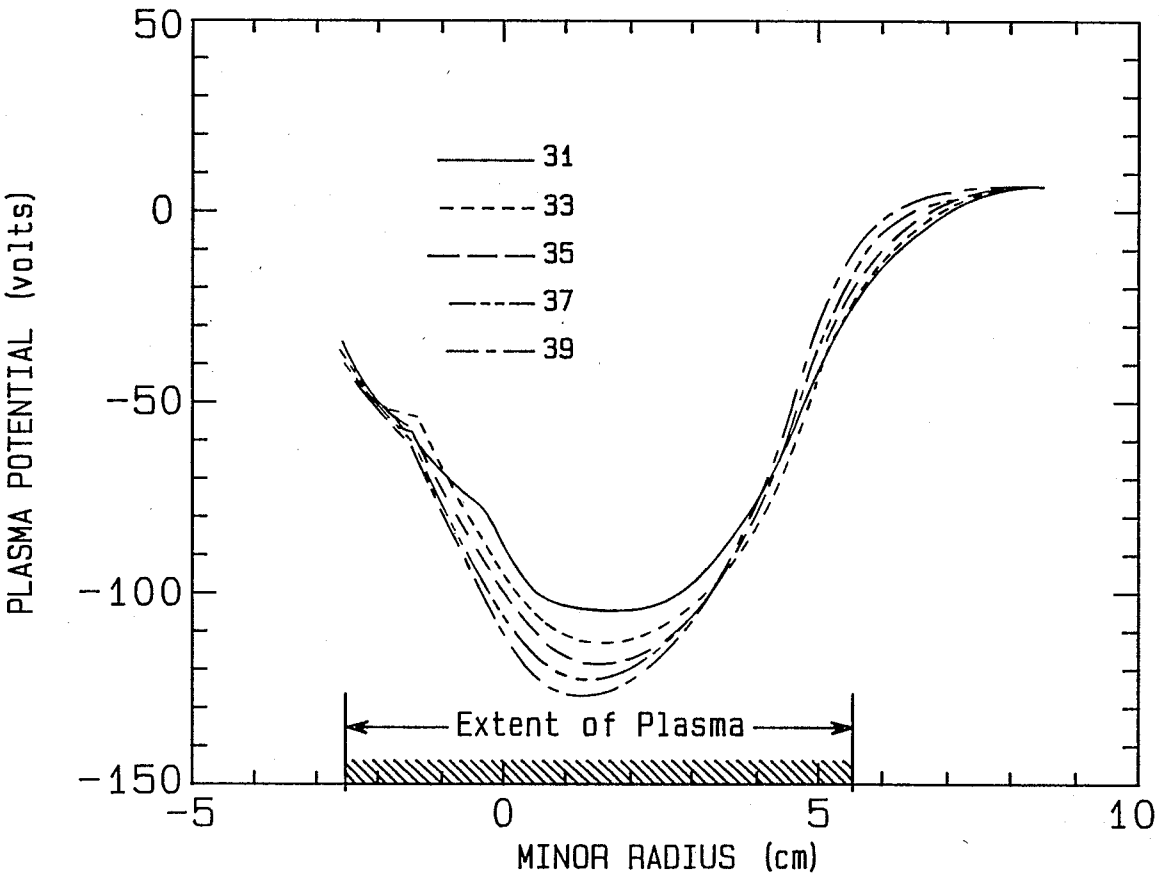
FIG. 3 illustrates the relationship between toroidal magnetic field strength and the plasma potential distribution within the plasma of FIG. 2 for a 660 amp plasma current.

FIG. 2 illustrates a poloidal cross-section of a tokamak during operation with an electron beam injection. FIG. 2 illustrates the positions within the vacuum vessel of the cathode, 1, top limiter, 19, side limiter, 21, diverter coils, 17, and external vertical field coils, 25. The cathode, 1, is positioned at one location in the vacuum vessel. Several top and side limiters, 19 and 21, are positioned around the major circumference of the vacuum vessel. Diverter coils, 17, and external vertical field coils, 25, are continuous around the vacuum vessel 23 at the position illustrated by FIG. 2. The center line of the major radius of the tokamak is located at the distance equal to the major radius of the tokamak from the center of vacuum vessel, 23, in the direction away from side limiter 21. The cathode, 1, emits electron beam 15. The cathode that is used for the preferred embodiment of the invention comprises close fitting cylindrical shells of lanthanum hexaboride on a carbon rod. The carbon rod is heated by a large ac current and the entire assembly is biased between −250 volts and −600 volts with respect to the anodes. The magnetic field that directs the beam vertically is produced by diverter coils 17, and vertical field coils external to the vacuum chamber, 25. The main plasma 11, carries plasma current of 330 amps to 1000 amps. Top limiter, 19, and side limiter, 21, are anodes, and vacuum vessel, 23, is connected to the FIG. 3 illustrates measured potential within the plasma for a plasma current of 660 amps at various toroidal magnetic field strengths. Curves 31, 33, 35,37 and 39 are for toroidal magnetic field strengths of 3.43 KG, 3.64 KG, 3.92 KG, 4.20 KG, and 4.48 KG respectively. This figure illustrates that the unidirectional electron beam injection creates a potential gradient and consequently a radial electric field throughout a substantial cross section of the plasma, and that both the magnitude of the potential and the potential gradient is a function of the toroidal magnetic field strength.

The relationship between potential and potential gradient and magnetic toroidal field strength illustrated by FIG. 3 forms the basis for creation of a radial electric field of a desired magnitude and distribution. Once the relationship shown in FIG. 3 has been experimentally determined for an apparatus and plasma current, a radial electric field of a desired magnitude can be created by appropriate selection of toroidal magnitude field strength.

Figure 4:
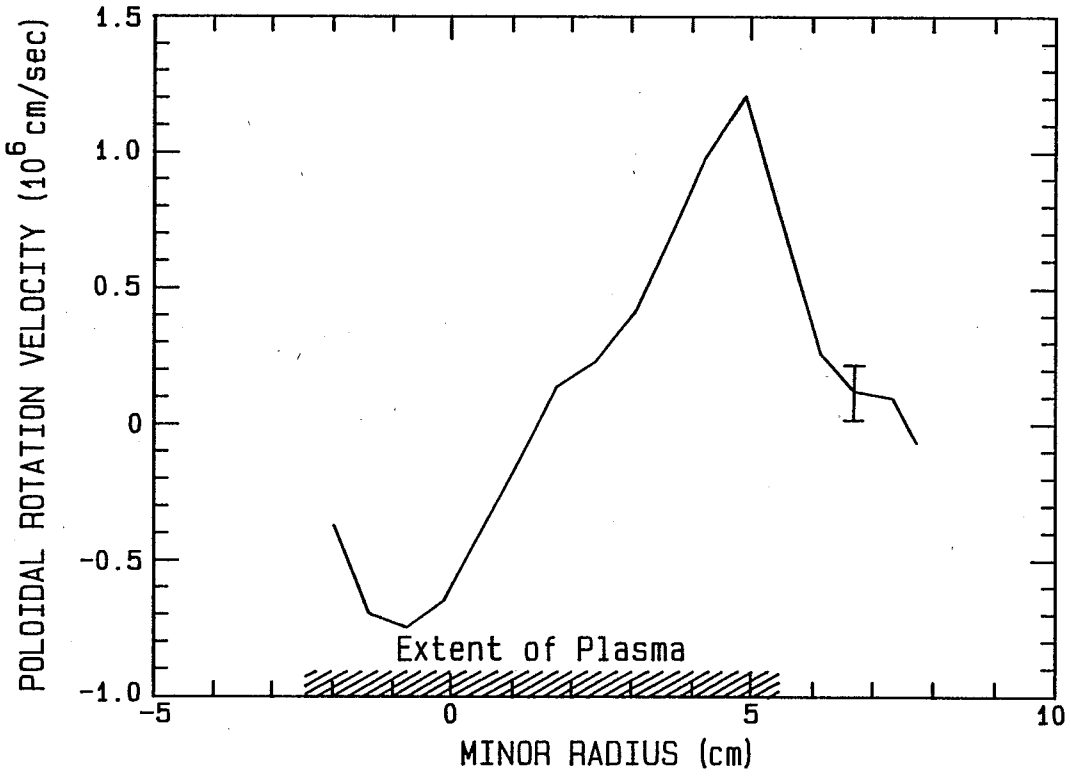
FIG. 4 illustrates the calculated poloidal rotation velocity of the plasma due to the radial electric fields and toroidal magnetic fields illustrated by FIG. 3.

FIG. 4 illustrates the poloidal rotation velocity calculated from the measured radial electric fields illustrated by FIG. 3 and the associated magnetic field. The straight line portion of the curve from −1.5 cm to +4.5 cm indicates that plasma rotates approximately as a rigid body through that region. This velocity field may cause heavier ions to be preferentially forced to the outer region of the plasma.

The embodiments of this invention in which an exclusive property or privilege is claimed are defined as follows:

1. A method for creating and sustaining a radial electric field and a selected maximum potential over a substantial area of a plasma of a tokamak comprising:

(a) providing a cathode within the tokamak which is capable of emitting a unidirectional beam of electrons;

(b) providing at least one or more anodes within the tokamak vacuum vessel that is positioned away from the cathode and adjacent to the region of plasma formation so that an electron emitted from the cathode will travel through or around the plasma before contacting an anode;

(c) determining a toroidal field strength that will cause the selected maximum potential within the tokamak;

(d) applying a toroidal magnetic field of the determined field strength;

(e) applying a vertical magnetic field within the tokamak vacuum vessel so that the magnetic field near the cathode will cause an electron emitted from the cathode to miss the cathode after traversing one circuit of the tokamak;

(f) creating a plasma within the tokamak vacuum vessel; and (g) injecting a unidirectional beam of electrons from the cathode.

2. The method of claim 1 wherein the vertical magnetic field is of strength of about 7–10 G near the cathode and is created by diverter coils positioned near the cathode and remote vertical field coils.

3. The method of claim 2 wherein the cathode that is provided is lanthanum hexaboride.

4. The method of claim 1 wherein the beam of electrons emitted from the cathode maintains the toroidal current in the tokamak.

* * * * *